United States Patent [19]

Bottenbruch et al.

[11] 3,978,157

[45] Aug. 31, 1976

[54] THERMOPLASTIC COMPOSITIONS COMPRISING AROMATIC POLYCARBONATE URETHANES

[75] Inventors: Ludwig Bottenbruch; Wolfgang Alewelt; Josef Merten, all of Krefeld, Germany

[73] Assignee: Bayer Aktiengesellschaft, Germany

[22] Filed: Feb. 12, 1975

[21] Appl. No.: 549,366

[30] Foreign Application Priority Data
Feb. 16, 1974 Germany............................ 2407567
July 27, 1974 Germany............................ 2436258

[52] U.S. Cl...................... 260/859 R; 260/77.5 CR; 260/77.5 UA
[51] Int. Cl.².................. C08L 75/12; C08F 18/24
[58] Field of Search................. 260/859 R, 77.5 CR

[56] References Cited
UNITED STATES PATENTS

| | | | |
|---|---|---|---|
| 3,049,505 | 8/1962 | Grabowski | 260/859 R |
| 3,573,255 | 3/1971 | Cyba | 260/47 XA |
| 3,879,348 | 4/1975 | Serini et al. | 260/47 XA |
| 3,880,783 | 4/1975 | Serini et al. | 260/47 XA |
| 3,880,799 | 4/1975 | Hoogeboom | 260/47 XA |

FOREIGN PATENTS OR APPLICATIONS

| | | | |
|---|---|---|---|
| 573,065 | 5/1959 | Belgium | 260/47 XA |

*Primary Examiner*—Murray Tillman
*Assistant Examiner*—Thurman K. Page
*Attorney, Agent, or Firm*—Connolly and Hutz

[57] ABSTRACT

Thermoplastic compositions of
1. 30 to 70 parts by weight of a thermoplastic aromatic polycarbonate urethane obtained by reacting a low molecular weight aromatic polycarbonate having terminal chloroformic acid ester groups and a degree of polymerization $\overline{P}_n$ of 1 to 20, preferably 1 to 10, with 1 to 15 mol %, based on the quantity of dihydroxy compound co-condensed in the polycarbonate, of disecondary aliphatic, cycloaliphatic or aromatic diamines, and
2. 70 to 30 parts by weight of a mixture of
   2.1. 0 to 100 % by weight of a copolymer of monomers from the groups
      2.1.1. styrene, α-methyl styrene and/or
      2.1.2. acrylonitrile, methacrylonitrile, acrylic acid esters, methacrylic acid esters,
   2.2. 100 to 0 % by weight of a graft polymer of a monomer mixture of
      2.2.1. 95 to 50 % by weight of styrene, α-methyl styrene, methyl methacrylate or mixtures thereof,
      2.2.2. 5 to 50 % by weight of acrylonitrile, methacrylonitrile or mixtures thereof
on a rubber.

4 Claims, No Drawings

THERMOPLASTIC COMPOSITIONS COMPRISING AROMATIC POLYCARBONATE URETHANES

This invention relates to thermoplastic compositions containing copolymers of resin-forming monomers and/or graft copolymers of resin-forming monomers on a rubber and polycarbonate urethanes containing approximately 98 to 70 % of carbonate groups and approximately 2 to 30 % of urethane groups.

Thermoplastic compositions containing mixtures of polycarbonates of di-(monohydroxy phenyl)-substituted aliphatic hyrocarbons, copolymers of resin-forming monomers and/or graft copolymers of resin-forming monomers on a rubber, are already known. Compared with pure polycarbonates, mixtures of this kind show a marked reduction in tensile strength, breaking elongation and dimensional stability under heat. It has now surprisingly been found that the decrease in the mechanical and thermal properties of corresponding mixtures with polycarbonate urethanes is considerably lower. One particularly surprising feature is that some of these mixtures show a breaking elongation comparable with that of the polycarbonates.

Accordingly, the termoplastic compositions according to the invention are mixtures of:

1. 30 to 70 parts by weight of a thermoplastic aromatic polycarbonate urethane obtained by reacting a low molecular weight aromatic polycarbonate having terminal chloroformic acid ester groups and a degree of polymerisation $\overline{P}_n$ of 1 to 20, preferably 1 to 10, with 1 to 15 mol %, based on the quantity of dihydroxy compound co-condensed in the polycarbonate, of disecondary aliphatic, cycloaliphatic or aromatic diamines, and
2. 70 to 30 parts by weight of a mixture of
   2.1 0 to 100 % by weight of a copolymer of monomers selected from the groups
      2.1.1. styrene, α-methyl styrene and/or
      2.1.2. acrylonitrile, methacrylonitrile, acrylic acid esters, methacrylic acid esters,
   2.2. 100 to 0 % by weight of a graft polymer of a monomer mixture of
      2.2.1. 95 to 50 % by weight of styrene, α-methyl styrene, methyl methacrylate or mixtures thereof,
      2.2.2. 5 to 50 % by weight of acrylonitrile, methacrylonitrile or mixtures thereof
   on a rubber.

Particularly preferred polycarbonate urethanes are thermoplastic polycarbonate urethanes having a molecular weight of from 10,000 to 200,000 consisting of recurring units corresponding to the formula $( -\!\!+\!\!A\!\!-\!\!]_n\!\!-\!\!B\!\!-\!\!)$, in which
$n$ is an integer from 1 to 400 (preferably 1 to 200, most preferably 1 to 50)
A represents the radical

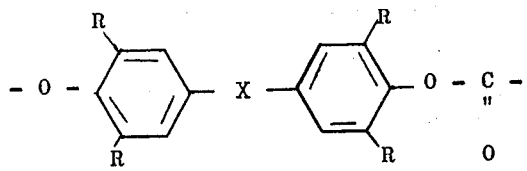

wherein
R = H, $C_1$—$C_3$—alkyl,

X = single bond, —O—, —CO—, —SO$_2$—, $C_1$–$C_{10}$-alkylene, $C_1$–$C_{10}$-alkylidene, $C_5$–$C_{15}$—cycloalkylene, $C_5$–$C_{15}$—cyclo-alkylidene or

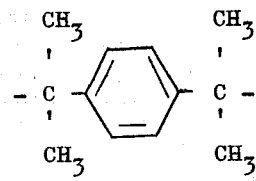

and
B represents the radical

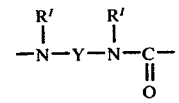

wherein
$R^I$ = $C_1$–$C_{10}$-alkyl, $C_1$–$C_{10}$-alkylidene, $C_5$–$C_{15}$-cycloalkyl, $C_5$–$C_{15}$-cycloalkylidene, a $C_7$–$C_{10}$-araliphatic or $C_6$–$C_{10}$-aromatic radical,
Y = a divalent aliphatic, cycloaliphatic or aromatic radical corresponding to the formula:

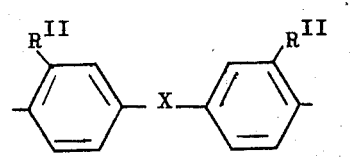

in which X is as defined above, and
$R^{II}$ = H, $C_1$–$C_3$-alkyl, a carboxylic acid ester group, a carbonamide group, nitrile or halogen, the molar ratio of A : B in the polycarbonate urethane being from 85 : 15 to 99 : 1.

In the graft polymer 2.2), the weight ratio of the rubber to the monomer mixture grafted onto the rubber is preferably from 85 : 15 to 40 : 60. The diameter of the graft polymer particles in the thermoplastic composition is preferably in the range from 0.01 to 5 μ and preferably from 0.03 to 1 μ. The proportion of rubber in the thermoplastic composition is from 10 to 35 % by weight and preferably from 10 to 30 % by weight.

The polycarbonate urethanes used for the thermoplastic compositions according to the invention may be obtained by reacting low molecular weight polycarbonates having terminal chloroformic acid ester groups and a degree of polymerisation $\overline{P}_n$ of 1 to 20, preferably from 1 to 10, with 1 to 15 mol %, based on the dihydroxy compound used, of disecondary aliphatic, cycloaliphatic or aromatic diamines. The low molecular weight polycarbonates themselves may be obtained in known manner by reacting dihydroxy compounds with phosgene or by reacting dichlorocarbonic acid esters of dihydroxy compounds in the presence of alkali hydroxides. Particularly suitable dihydroxy compounds are dihydroxy diaryl alkanes, including those which contain alkyl groups or chlorine or bromine atoms in the o-position to the hydroxyl group. The following represent preferred dihydroxy diaryl alkanes: 4,4'-dihydroxy-2,2-diphenyl propane (bisphenol A), tetramethyl bisphenol A, tetrachloro bisphenol A, tetrabromo bisphenol A and bis-(4-hydroxy phenyl)-*p*-diisopropyl benzene. It is also possible to use branched polycarbonates in addition to polycarbonates obtained using dihydroxy diaryl alkanes alone. To obtain branched polycarbonates from 0.2 to 2 mol % of the dihydroxy compound is replaced by a polyhydroxy compound. Suitable polyhydroxy compounds are, for example, 2,2-bis-[4,4(4,4'-dihydroxy- diphenyl)-cyclohexyl]-propane, hexa-(4-hydroxy phenyl isopropylidene phenyl)-ortho-terephthalic acid ester, phloroglucinol, 1,3,5-tri-(4-hydroxy phenyl)-benzene and, preferably, tetra-(4-hydroxy phenyl)-methane, tetra-[4-(dimethyl-4-hydroxy phenyl)-methyl phenoxy]-methane and 1,4-bis-[4',4''-dihydroxy triphenyl)-methyl]-benzene.

To produce the high molecular weight polycarbonate urethanes, the low molecular weight polycarbonates having terminal chloroformic acid ester groups may be reacted with disecondary aliphatic, cycloaliphatic or aromatic diamines in the presence of alkali hydroxides and tert.-amines such as, for example, triethyl amine. The low molecular weight polycarbonates having terminal chloroformic acid groups react in the presence of alkali hydroxides both with the diamines, the reaction being accompanied by the elimination of NaCl, to form a urethane and also with themselves, in which case the reaction is accompanied by the elimination of NaCl and $Na_2CO_3$, to form a carbonate group. Particularly suitable diamines are 1,6-N,N'-dialkyl hexamethylene diamine, piperazine, 2,5-dialkyl piperazine, N,N'-dialkyl-p-phenylene diamine, bis-(4-N-methyl aminophenyl)-p-diisopropyl benzene, bis-(4-N-alkyl amino-3-carboalkoxy phenyl)-alkane such as, for example, bis-(4-N-methyl amino-3-carbomethoxy phenyl)-methane and 4,4'-di-N-alkyl amino-3,3'-dicarboalkoxy diphenyl.

The polycarbonate urethanes, which contain approximately 2 to 30 % of urethane groups and approximately 98 to 70 % of carbonate groups, have molecular weights in the range from 10,000 to 200,000 and preferably in the range from 20,000 to 40,000.

The second constituent of the thermoplastic compositions is a graft copolymer on a rubber base or a copolymer of styrene, α-methyl styrene, methyl methacrylate or mixtures thereof and acrylonitrile, methacrylonitrile or methyl methacrylate or mixtures thereof, or a mixture of graft copolymer and copolymer. In the graft copolymer, a monomer mixture of the monomers used for the copolymer is graft-polymerised onto a rubber. Copolymers of the kind described above may be formed as secondary products during the graft-polymerisation reaction, especially in cases where large quantities of monomers are polymerised in the presence of small quantities of rubber. Any elasticising component may be used as the rubber component providing it has elastomeric behaviour. Particularly suitable rubber components are polybutadiene, butadiene-styrene copolymers containing up to 30 % by weight of copolymerised styrene, copolymers of butadiene and acrylonitrile with up to 20 % by weight of acrylonitrile, copolymers of butadiene with up to 20 % by weight of a lower alkyl ester of acrylic acid or methacrylic acid such as, for example, methyl acrylate, ethyl acrylate, butyl acrylate, methyl methacrylate or ethyl methacrylate and copolymers of butyl acrylate with up to 20 % by weight of acrylonitrile. The proportion of rubber in the graft copolymer must be between 15 and 85 % by weight. The particle diameter of the graft copolymers in the thermoplastic composition preferably must be between 0.01 and 5 μ and most preferably between 0.03 and 1 μ.

Graft copolymers of this kind are obtained by subjecting the monomers to radical polymerisation in the presence of a rubber latex. The particle size in the latex largely determines the particle size in the finished graft copolymer.

The constituents of the thermoplastic composition according to the invention may be separately prepared and then mixed in molten form in known mixing machines such as mixing rolls, double screw extruders or internal kneaders. It is also possible to mix the copolymers and graft copolymers by working them up together and then further processing the resulting mixture with the polycarbonate urethanes. Fillers, glass fibers, pigments or other additives, such as stabilisers, flameproofing agents, flow-promoting agents, lubricants, mould-release agents and antistatic agents, may be added to the thermoplastic compositions during mixing.

The thermoplastic compositions according to the invention may be used for the production of shaped articles, for example by injection moulding or deep drawing prefabricated sheets or films.

In the following Examples, the parts quoted are parts by weight unless otherwise stated.

A. PRODUCTION OF THE POLYCARBONATE URETHANES

EXAMPLE 1

57 parts of phosgene are introduced with stirring over a period of 60 minutes at 25°C into a mixture of 91 parts of bisphenol A, 2.1 parts of p-tert.-butyl phenol, 900 parts of methylene chloride, 450 parts of water and 75 parts of 45 % sodium hydroxide. After 30 and 45 parts, respectively, of phosgene have been introduced, further quantities of the 45 % sodium hydroxide solution are added (30 parts in each case). 15.4 parts of bis-(4-N-methyl amino-3-carbomethoxy phenyl)-methane (10 mol %) and 5 parts of a 4 % aqueous triethyl amine solution are then added with stirring. After stirring for another 60 minutes, the organic phase becomes highly viscous. It is separated off, washed twice with 2 % phosphoric acid and then with water until free from electrolyte. After the solvent has been evaporated off, the polycarbonate is dried in vacuo at 120°C.

Relative viscosity: $\eta_{rel} = 1.28$ (as measured on a 5 g/l solution in methylene chloride at a temperature of 25°C).

EXAMPLE 2

54 parts of phosgene are introduced with stirring over a period of 60 minutes at 25°C into a mixture of 91 parts of bisphenol A, 2.0 parts of p-tert.-butyl phenol, 900 parts of methylene chloride, 450 parts of water and 75 parts of 45 % sodium hydroxide solution. After 30 and 45 parts, respectively, of phosgene have been introduced, further quantities of the 45 % sodium hydroxide solution are added (25 parts in each case). 4.5 parts of bis-(4-N-methyl aminophenyl)-p-diisopropyl benzene (3 mol %) and 5 parts of a 4 % aqueous triethyl amine solution are then added with stirring. After stirring for another 60 minutes, the organic phase becomes highly viscous. It is separated off, washed twice with 2 % phosphoric acid and then with water until free from electrolyte. After the solvent has been evaporated off, the polycarbonate is dried in vacuo at 120°C. Relative viscosity $\eta_{rel} = 1.29$ (as measured on a 5 g/l solution in methylene chloride at a temperature of 25°C).

B. PRODUCTION OF THE THERMOPLASTIC COMPOSITIONS

EXAMPLE 3

60 parts of an ABS-graft polymer mixture consisting of:
a. 65 parts of a graft polymer obtained by grafting 35 parts of styrene and 15 parts of acrylonitrile onto 50 parts of a polybutadiene, and
b. 35 parts of a copolymer of styrene and acrylonitrile in a ratio of 70 : 30 having an intrinsic viscosity [ $\eta$ ] of 79.1 ml/g (as measured in DMF at 20°C), are extruded in a double screw extruder at 220°C together with 40 parts of an aromatic polycarbonate urethane according to Example 1, followed by granulation.

EXAMPLE 4

60 parts of an ABS-graft polymer mixture according to Example 3 are extruded at 240°C in a double screw extruder together with 40 parts of an aromatic polycarbonate urethane according to Example 2 followed by granulation.

EXAMPLE 5

60 parts of an ABS-graft polymer mixture according to Example 3 are extruded in a double-screw extruder at 220°C together with 40 parts of an aromatic polycarbonate urethane having a relative viscosity $\eta_{rel}$ of 1.30 (as measured on a 5 g/l solution in methylene chloride at 25°C) obtained in accordance with Example 1 from 90 mol % of bisphenol A and 10 mol % of bis-(4-N-methyl aminophenyl)-p-diisopropyl benzene followed by granulation.

EXAMPLE 6

60 parts of an ABS-graft polymer mixture according to Example 3 are extruded in a double-screw extruder at 240°C together with 40 parts of a polycarbonate urethane having a relative viscosity $\eta_{rel}$ of 1.29 (as measured on a 5 g/l solution in methylene chloride at 25°C obtained in accordance with Example 2 from 97 mol % of bisphenol A and 3 mol % of piperazine followed by granulation.

EXAMPLE 7

60 parts of an ASA-graft polymer, obtained by grafting 23 parts of acrylonitrile and 47 parts of styrene onto 30 parts of a butyl acrylate rubber, are extruded in a double screw extruder at 220°C together with 40 parts of an aromatic polycarbonate urethane according to Example 1, followed by granulation.

EXAMPLE 8

60 parts of an ASA-graft polymer according to Example 7 are extruded in a double screw extruder at 220°C together with 40 parts of an aromatic polycarbonate urethane according to Example 2, followed by granulation.

EXAMPLE 9

60 parts of an ASA-graft polymer according to Example 7 are extruded in a double-screw extruder at 220°C together with 40 parts of an aromatic polycarbonate polyurethane according to Example 5, followed by granulation.

EXAMPLE 10

60 parts of an ASA-graft polymer according to Example 7 are extruded in a double screw extruder at 220°C together with 40 parts of a polycarbonate urethane according to Example 6, followed by granulation.

EXAMPLE 11 (Comparison Example)

60 parts of an ABS-polymer according to Example 3 are extruded in a double screw extruder at 220°C together with 40 parts of an aromatic polycarbonate having a relative viscosity $\eta_{rel}$ of 1.28 (as measured on a 5 g/l solution in methylene chloride at 25°C) based on 4,4'-dihydroxy-2,2-diphenyl propane (bisphenol A), followed by granulation.

EXAMPLE 12 (Comparison Example)

60 parts of an ASA-polymer according to Example 6 are extruded at 220°C in a double screw extruder together with 40 parts of an aromatic polycarbonate according to Example 11, followed by granulation.

The granulates of the thermoplastic compositions according to Examples 3 to 12 were injection-moulded at 220°C to form test specimens. The properties of the test specimens are set out in Table 1.

Table 1

| | EXAMPLES | | | | | | | | | |
|---|---|---|---|---|---|---|---|---|---|---|
| | 3 | 4 | 5 | 6 | 7 | 8 | 9 | 10 | 11 | 12 |
| Tensile strength (kp/cm²) (DIN 53 455) | 443 | 457 | 449 | 452 | 516 | 497 | 502 | 502 | 383 | 482 |
| Elongation at break (%) (DIN 53 455) | 102 | 102 | 106 | 93 | 48 | 81 | 74 | 94 | 60 | 63 |
| Stretching tension (kp/cm²) (DIN 53 455) | 471 | 449 | 457 | 451 | 619 | 585 | 598 | 580 | 445 | 586 |
| E-modulus (kp/cm²) (DIN 53 455) | 17800 | 17400 | 17100 | 17000 | 24700 | 23300 | 23900 | 23300 | 16900 | 23500 |
| Impact strength (cmkp/cm²) (DIN 53 453) | | | | | unbroken | | | | | |
| Vicat method A (°C) | 129 | 136 | 133 | 133 | — | — | — | — | 129 | — |
| Vicat method B (°C) (DIN 53 460) | 110 | 114 | 114 | 113 | 110 | 111 | 111 | 110 | 111 | 110 |

We claim:
1. A thermoplastic composition comprising
I. from 30 to 70 parts by weight of a thermoplastic aromatic polycarbonate urethane obtained by reacting a low molecular weight aromatic polycarbonate having terminal chloroformic acid ester groups and a degree of polymerization $\bar{P}_n$ of from 1 to 20 with from 1 to 15 mol %, based on the quantity of dihydroxy compound cocondensed in the polycarbonate during the production thereof, of at least one disecondary aliphatic, cycloaliphatic or aromatic diamine and
II. from 70 to 30 parts by weight of a composition comprising
   a. from 0 to 100% by weight of a polymer of at least one monomer selected from the group consisting of styrene and α-methylstyrene or a copolymer of at least one monomer selected from the group consisting of styrene and α-methylstyrene with at least one other monomer selected from the group consisting of acrylonitrile, methacrylonitrile, acrylic acid ester and methacrylic acid ester and
   b. from 100 to 0% by weight of a graft polymer comprising a rubber substrate having grafted thereon a mixture of from 95 to 50% by weight of at least one monomer selected from the group consisting of styrene, α-methylstyrene and methylmethacrylate and from 5 to 50% by weight of at least one monomer selected from the group consisting of acrylonitrile and methacrylonitrile.

2. A thermoplastic composition as claimed in claim 1, in which the degree of polymerisation $\bar{P}_n$ is from 1 to 10.

3. A thermoplastic composition as claimed in claim 1, in which the aromatic polycarbonate polyurethane has a molecular weight of from 10,000 to 200,000 and consists of recurring units corresponding to the formula
$(-\!\!+\!\!A\!\!\;]_{\overline{n}}\;\; B\!\!\rightarrow\!)$,
wherein
   $n$ is an integer from 1 to 400
   A represents the radical

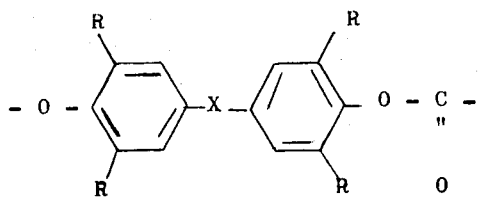

wherein
   R represents H or $C_1$–$C_3$ alkyl,
   X represents a single bond, —O—, —CO—, —SO$_2$—, $C_1$–$C_{10}$ alkylene, $C_1$–$C_{10}$ alkylidene, $C_5$–$C_{15}$ cycloalkylene, $C_5$–$C_{15}$ cycloalkylidene or

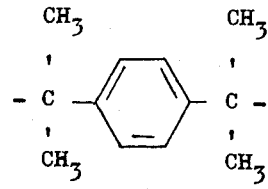

and
   B represents the radical

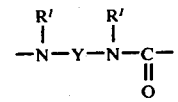

wherein
   R' represents $C_1$–$C_{10}$ alkyl, $C_1$–$C_{10}$ alkylidene, $C_5$–$C_{15}$ cycloalkyl, $C_5$–$C_{15}$ cycloalkylidene, a $C_7$–$C_{10}$ araliphatic or $C_6$–$C_{10}$ aromatic radical,
   Y represents a divalent aliphatic, cycloaliphatic or aromatic radical corresponding to the formula:

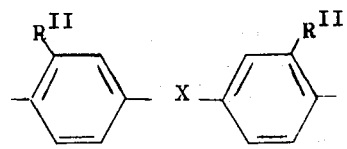

in which X is as defined above, and
   R'' represents H, $C_1$–$C_3$ alkyl, a carboxylic acid ester group,
   a carbonamide group, nitrile or halogen,
   the molar ratio of A : B in the polycarbonate polyurethane being from 85 : 15 to 99 : 1.

4. A thermoplastic composition as claimed in claim 1 containing from 10 to 35 % by weight rubber.

* * * * *